May 30, 1944.  W. SHIPPEE ET AL  2,350,255
FASTENING DEVICE
Filed Dec. 6, 1941
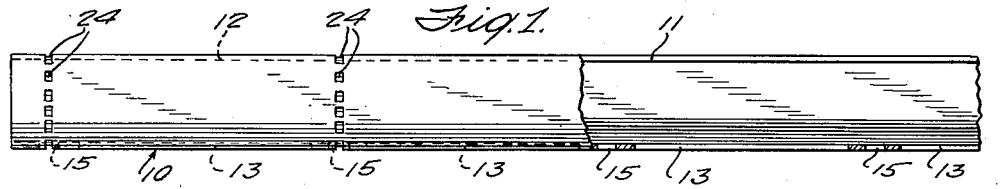
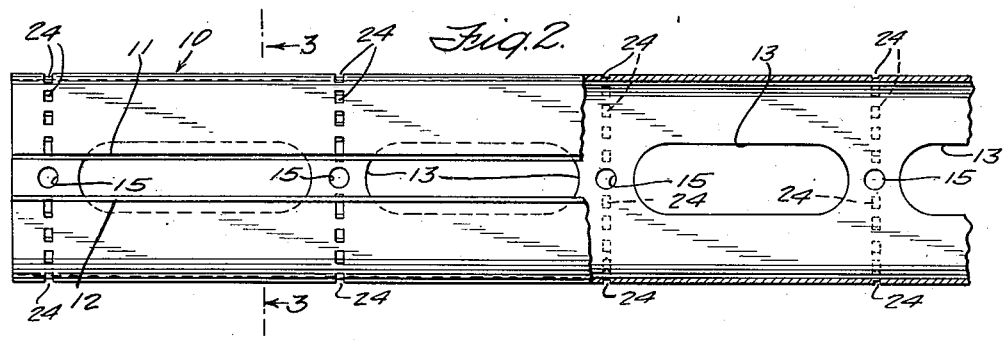
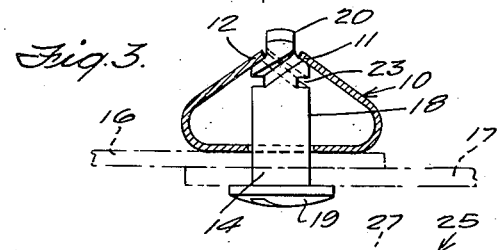 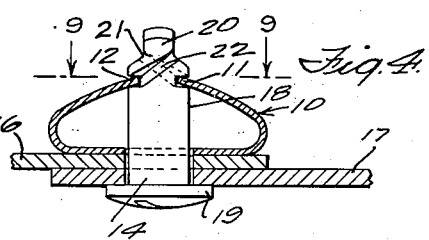
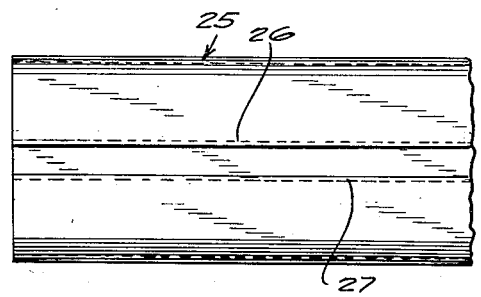 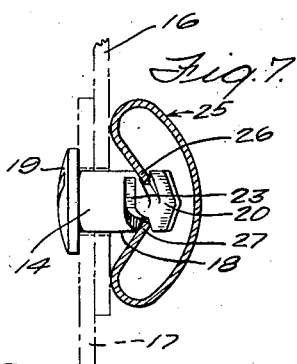
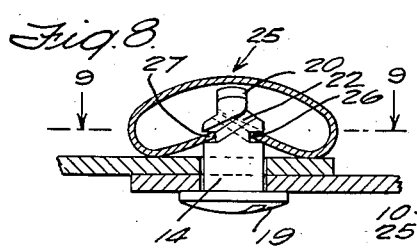 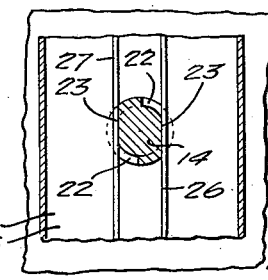
INVENTOR
WINSOR SHIPPEE
CARL C. SHIPPEE
BY
Frederic P. Warfield
ATTORNEY Patented May 30, 1944

2,350,255

UNITED STATES PATENT OFFICE 2,350,255

FASTENING DEVICE

Winsor Shippee and Carl C. Shippee,
Red Bank, N. J.

Application December 6, 1941, Serial No. 421,904

3 Claims. (Cl. 85—36)

This invention relates to fastening devices and particularly to devices which may be used wherever vibration occurs and wherever it is necessary to provide fastening devices having quick fastening and releasing action.

An object of the invention is to provide a shake-proof fastening device which locks into its holding position.

Another object of the invention is to provide a fastening device for fastening two members together at a plurality of spaced points, one portion of the fastening device being a single piece which is engageable with certain other portions at the spaced securing points.

Another object of the invention is to provide a fastening device in which one of the cooperating members is elongated and provided with means to permit separation into a number of smaller parts.

Another object of the invention is to provide a fastening device for securing two members together at a plurality of spaced points which comprises a single strip engageable by studs at any point along the length thereof, the studs having a locking cooperation with the strip to secure the members together.

Other objects of the invention will in part be obvious and will in part appear hereinafter.

The invention accordingly comprises an article of manufacture possessing the features, properties, and the relation of elements which will be exemplified in the article hereinafter described, and the scope of the application of which will be indicated in the claims.

For a fuller understanding of the nature and objects of the invention reference should be had to the following detailed description taken in connection with the accompanying drawing, in which:

Fig. 1 is a side elevational view partly in section of a portion of one form of the stud engaging strip of the invention;

Fig. 2 is a plan view of the same portion of the strip of Fig. 1;

Fig. 3 is a sectional view taken on the line 3—3 of Fig. 2 and showing a stud in its initial position before turning it to lock the two members together;

Fig. 4 is a sectional view also taken on the line 3—3 of Fig. 2 showing the same stud turned into its locked position;

Fig. 5 is a side elevational view of a modified form of the stud engaging strip;

Fig. 6 is a plan view of the strip of Fig. 5;

Fig. 7 is a sectional view through the strip of Fig. 6 showing a stud in partially locked position before being turned all the way to complete the locking action;

Fig. 8 is a similar view showing the same stud turned into its locked position; and Fig. 9 is a sectional view taken through the stud of either Figs. 4 or 8 at the point of contact with the edges of the strip on the lines 9—9 of those figures.

The form of the invention in Figs. 1 to 4 inclusive comprises a strip 10 of strong stiff material, preferably steel, having the sides 11 and 12 thereof bent upwardly and inwardly so that their edges are spaced a short distance from each other, symmetrically on opposite sides of the center line of the strip and are inclined upwardly or away from the body of the strip at an acute angle, as shown in Fig. 3. The sides thus form elements which are resiliently supported from the body of the strip and thus from any member upon which the strip rests, the resiliency of the supporting material resisting movement in any direction. The strip is provided with a plurality of elongated openings 13 through which the studs 14 may be inserted, and small holes 15 may be provided between these openings for initially fastening the strip to the member 16 which is to be secured to the member 17 by means of the fastening device. The members 16 and 17 are intended to represent any parts desired to be fastened together.

The stud 14 has a straight shank 18 which is provided at one end with a suitable slotted head 19 and at its other end with a flattened end 20 adapted to pass freely between the edges 11 and 12 of the strip 10 when the stud 14 is inserted through the suitable holes provided in the pieces 16 and 17 and through one of the openings 13 in the strip 10. The stud tapers outwardly from the flattened end 20, as at 21, and this tapered portion is provided with two spiral grooves or threads 22 which pass around the stud in the same direction toward the head and terminate in grooves 23 which are perpendicular to the axis of the stud. The bottoms of the grooves or threads 22 follow the curvature of the stud as these threads pass around it, but the bottom of the grooves 23 are flat and straight, forming cords of the cross section of the stud and intersecting the outer surface of the stud at the extreme ends of the grooves. The side walls of the grooves 23 form flat surfaces perpendicular to the axis of the stud. These grooves 23 are slightly deeper than the grooves or threads 22, as shown in the section of Fig. 9, so that the bottoms of the grooves 23 are closer together as measured through the center of the stud than are the bottoms of the grooves or threads 22.

When the stud is inserted through the holes in the members 16 and 17 and through one of the openings 13 in the strip 10, the flattened end 20 guides the stud between the edges 11 and 12 of the strip 10, whereupon rotation of the stud in a clockwise direction by means of a screw driver or other suitable implement will cause the edges 11 and 12 of the strip 10 to engage the spiral grooves 22. Further rotation of the stud causes the edges 11 and 12, under control of the grooves 22, to spread slightly away from each other and at the same time to be forced towards the body of the strip 10, until finally they snap into the perpendicular grooves 23 which, as has been mentioned above, are deeper than the grooves 22. The stud is then locked in position with the edges 11 and 12 of the strip 10 deformed out of their normal position in two directions: (1) towards the body of the strip and (2) spread apart away from each other. The outer surfaces of the edges 11 and 12 then lie flat under tension against the flat side walls of the grooves 23 which exert holding friction thereon, while at the same time, the opposed edges proper lie flat against the bottoms of the grooves 23 and press inwardly thereagainst. The result is that the members 16 and 17 are locked together and are thus held securely even under conditions of extreme vibration.

In releasing the fastener the stud must be turned in a counterclockwise direction with sufficient force to overcome the friction of the outer surfaces of the edges 11 and 12 against the side walls of the grooves 23 and at the same time to spread the edges apart as they leave the flat bottoms of the grooves 23 and pass into the shallower threads 22.

While the small holes 15 have been shown in the strip 10 for the purpose of initially fastening the strip to the member 16, these may be omitted if desired, because in use, after a stud has been inserted and locked at each end of the strip, the strip will be held in position so that other studs may be inserted.

In some instances we may want to make the strip 10 so that the strip may be easily separated into sections of any desired length containing openings 13 for any number of studs. For this purpose we have shown a series of perforations 24 which extend from the edge 11 of the strip around the body portion between every two openings 13 to the edge 12. As shown, these perforations are aligned with the holes 15 and permit the strip to be broken off, so that a short piece for a single fastener may be used or a section broken off with the desired number of openings for a like number of studs. These perforations may, of course, be omitted if desired.

Another embodiment of the invention is shown in Figs. 5 to 8 inclusive in which the strip 25 is adapted to be used in the reverse position and no openings are necessary in the body part of the strip to receive the studs. The strip 25 has two side edges 26 and 27 which are bent over upon the body of the strip to lie spaced from each other, symmetrically with the center line of the strip, and extending at an angle towards the center surface of the strip, as indicated in Fig. 7. The main body of the strip is arched as shown in Fig. 7 to permit the stud to enter the space between the side edges 26 and 27 without touching the inner surface of the body portion of the strip.

The stud 14, shown in Figs. 7 and 8, may be the same as the stud 14 of Figs. 3 and 4 and acts in exactly the same manner. When the stud is inserted through suitable openings in the members 16 and 17 which are to be attached together, the flattened end 20 guides the stud between the edges 26 and 27 of the strip 25 which is placed against the member 16 in the reverse position from that of the strip 10, so that the main body of the strip is away from the member 16. Rotation of the stud 14 then causes the edges 26 and 27 to spread apart as they slide into the spiral grooves 22 of the stud and at the same time to be forced towards the member 16 and to snap into the perpendicular grooves 23, as shown in Fig. 8.

Since no openings for the stud are necessary in the strip 25, studs may be inserted at any point along the length of the strip. Also since the outer surface of the strip is free from openings, it presents a smooth surface so that the strip may be used as a finishing strip if desired.

The configuration of the strip 25 and the material out of which it is made should be such that the edges 26 and 27 are maintained under tension when the stud is locked into position so as to insure the holding of the fastener under conditions of vibration.

The stud shown in the drawing must be turned through 180 degrees either to lock or unlock it. However, this angle may be changed, as desired, by changing the length of the threads 22.

Of course the length of the stud should be such that it will take the initial position with respect to the strip, as indicated in Fig. 3, with the side edges adjacent the ends of the grooves 22. The studs therefore will vary in length as determined by the thickness of the parts 16 and 17 and the size of the strips 10 and 25.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. A fastening device comprising, in combination, a spring plate member in the form of a relatively long strip, the side edges of said strip being bent over upon the body of the strip and lying in spaced relation to each other and to the body of said strip, said member having a plurality of spaced openings substantially along the center line thereof; and a plurality of studs each provided with helical grooves adapted to engage the edges of said strip and to have interlocking relation therewith, the inner ends of said grooves being deepened to permit said side edges to spring towards each other when said stud is turned sufficiently so that said edges are at the inner ends of said grooves.

2. A fastening device comprising, in combination, a spring plate member in the form of a relatively long strip, the side edges of said strip being bent over upon the body of the strip and lying in spaced relation to each other and to the body of said strip, said member having a plurality of spaced openings substantially along the center line thereof; and a plurality of studs each provided with helical grooves adapted to engage the edges of said strip and to have interlocking relation therewith; said strip being provided with transverse rows of perforations between adjacent openings so as to weaken the strip at the perforations to permit breaking off the strip at one of said rows of perforations.

3. In a fastening device, a multiple spring member adapted to cooperate with fastening studs and comprising a strip of resilient material having the side edges thereof bent over upon the body portion of the strip and spaced from each other and from the body portion of said strip, and a plurality of openings through the body portion of said member and aligned with the space between said side edges, there being a row of perforations between every two of said openings whereby said strip may be broken off in desired lengths.

WINSOR SHIPPEE.
CARL C. SHIPPEE.